United States Patent
Quinlan et al.

(10) Patent No.: US 9,106,693 B2
(45) Date of Patent: Aug. 11, 2015

(54) ATTACK DETECTION AND PREVENTION USING GLOBAL DEVICE FINGERPRINTING

(71) Applicant: Juniper Networks, Inc., Sunnyvale, CA (US)

(72) Inventors: Daniel J. Quinlan, Sunnyvale, CA (US); Kyle Adams, West Henrietta, NY (US); Oskar Ibatullin, Sunnyvale, CA (US); Yuly Tenorio Morales, Concord, CA (US); Robert W. Cameron, Mountain View, CA (US); Bryan Burns, Portland, OR (US)

(73) Assignee: Juniper Networks, Inc., Sunnyvale, CA (US)

( * ) Notice: Subject to any disclaimer, the term of this patent is extended or adjusted under 35 U.S.C. 154(b) by 6 days.

(21) Appl. No.: 13/910,019

(22) Filed: Jun. 4, 2013

(65) Prior Publication Data
US 2014/0283061 A1    Sep. 18, 2014

Related U.S. Application Data

(60) Provisional application No. 61/800,243, filed on Mar. 15, 2013.

(51) Int. Cl.
*H04L 29/06* (2006.01)
*H04L 29/08* (2006.01)

(52) U.S. Cl.
CPC ........ *H04L 63/1441* (2013.01); *H04L 63/1408* (2013.01); *H04L 67/02* (2013.01)

(58) Field of Classification Search
CPC . H04L 63/1408; H04L 43/16; H04L 63/1441; H04L 2209/76; H04L 63/14
USPC ..................................................... 726/22, 23
See application file for complete search history.

(56) References Cited

U.S. PATENT DOCUMENTS

| 7,526,806 | B2 | 4/2009 | Wiley et al. | |
|---|---|---|---|---|
| 2005/0021649 | A1* | 1/2005 | Goodman et al. | 709/207 |
| 2006/0107321 | A1* | 5/2006 | Tzadikario | 726/22 |
| 2008/0077793 | A1* | 3/2008 | Tan et al. | 713/168 |

(Continued)

OTHER PUBLICATIONS

Holm, "Empirical Analysis of System-Level Vulnerability Metrics through Actual Attacks", Dec. 2012, IEEE, p. 825-837.*

(Continued)

*Primary Examiner* — Thanhnga B Truong
*Assistant Examiner* — Gregory Lane
(74) *Attorney, Agent, or Firm* — Shumaker & Sieffert, P.A.

(57) ABSTRACT

This disclosure describes a global attacker database that utilizes device fingerprinting to uniquely identify devices. For example, a device includes one or more processors and network interface cards to receive network traffic directed to one or more computing devices protected by the device, send, to the remote device, a request for data points of the remote device, wherein the data points include characteristics associated with the remote device, and receive at least a portion of the requested data points. The device also includes a fingerprint module to compare the received portion of the data points to sets of data points associated with known attacker devices, and determine, based on the comparison, whether a first set of data points of a first known attacker device satisfies a similarity threshold. The device also includes an security module to selectively manage, based on the determination, additional network traffic directed to the computing devices.

22 Claims, 5 Drawing Sheets

(56) References Cited

U.S. PATENT DOCUMENTS

| | | |
|---|---|---|
| 2009/0064334 A1 | 3/2009 | Holcomb |
| 2009/0265777 A1* | 10/2009 | Scott ............................... 726/11 |
| 2010/0030891 A1* | 2/2010 | Kim et al. .................... 709/224 |
| 2010/0305990 A1 | 12/2010 | Tyree et al. |
| 2011/0016525 A1* | 1/2011 | Jeong et al. .................... 726/23 |
| 2011/0047620 A1 | 2/2011 | Mahaffey et al. |
| 2011/0067108 A1* | 3/2011 | Hoglund ........................ 726/24 |
| 2011/0138470 A1* | 6/2011 | Davis et al. .................... 726/25 |
| 2011/0191849 A1 | 8/2011 | Jayaraman et al. |
| 2012/0023572 A1 | 1/2012 | Williams, Jr. et al. |
| 2012/0210421 A1* | 8/2012 | Ormazabal et al. ............. 726/22 |
| 2013/0247195 A1 | 9/2013 | Takahashi et al. |
| 2013/0254889 A1 | 9/2013 | Stuntebeck |

OTHER PUBLICATIONS

Extended Search Report from counterpart European Application No. 14159575.1, dated Jul. 7, 2014, 8 pp.

"Enterprise Web Fraud" ThreatMetrix—Cybercrime Prevention, 2013, available at http://www.threatmetrix.com/solutions/enterprise-web-fraud/, accessed May 31, 2013, 2 pgs.

Eckersley, Peter "A Primer on Information Theory and Privacy", Electronic Frontier Foundation, Jan. 26, 2010, available at https://www.eff.org/deeplinks/2010/01/primer-information-theory-and-privacy, accessed May 31, 2013, 4 pgs.

* cited by examiner

ATTACK DETECTION AND PREVENTION USING GLOBAL DEVICE FINGERPRINTING

This application claims the benefit of U.S. Provisional Application No. 61/800,243, filed Mar. 15, 2013, the entire content of which is incorporated by reference herein.

TECHNICAL FIELD

This disclosure relates to computing systems and, more specifically, computing system attack detection and prevention.

BACKGROUND

There is an increasing volume and sophistication of cyber attacks, particularly those aimed at web applications and servers, which deal in high-value traffic. Insecure applications and servers can lead to customer loss, financial loss, damaged reputation and legal conflicts. In an attempt to block cyber attacks from a group of hackers, for example, a company may identify the Internet protocol (IP) addresses associated with the hackers and block any attempt by the identified IP addresses to connect to the company's servers. However, IP addresses are not a reliable method to track the identity of an attacker. An attacker may use a proxy server, network address translation servers, or other mechanisms to hide and/or change the IP addresses from which the attacker is attacking the company.

SUMMARY

In general, this disclosure describes techniques for using a global attacker database that utilizes device fingerprinting to uniquely identify a device used to attack a company's data center or other computer system. Techniques of this disclosure enable a company to have knowledge of the attacking devices, not just their IP address, and enable the knowledge to be quickly disseminated across a data center and into a security service that can be hosted in a cloud data center used by one or more organizations. Security devices may be configured to detect an attack and generate a fingerprint of each attacking device. The fingerprint may include information about the attacker device that uniquely or nearly uniquely identifies the attacker device even if the attacker device changes its IP address, goes behind a proxy, uses other anonymization services, or otherwise attempts to obfuscate the identity of the attacker device. Once the fingerprint is generated, the security devices may send the fingerprint to the security service.

The security service may be implemented locally, at the security device, or in a cloud computing system. By implementing the security service in a cloud computing system, the security service may use a global database to aggregate information about attacker devices, including fingerprints, from a number of different companies to provide a consolidation point for attacker and threat information. The security service may then propagate the learned attacker device information to other security devices in the network. In this manner, a global database of attacker device fingerprints may be generated and distributed across security devices such that the security devices can identify and mitigate attacks initiated by attacker devices, even if the attacker devices had never before attacked resources protected by the particular security device.

In one example, a method includes receiving, by a security device and from a device, network traffic directed to one or more computing devices protected by the security device, responsive to receiving the network traffic, sending, by the security device and to the device, a request for a plurality of data points for the device, wherein the data points include characteristics associated with the device, and receiving, by the security device and from the device, at least a portion of the requested plurality of data points. The method may also include comparing, by the security device, the received portion of the requested plurality of data points to respective sets of data points associated with one or more known attacker devices, determining, based on the comparison, whether a first respective set of data points associated with a first known attacker device satisfies a similarity threshold, and selectively manage, based on the determination, additional network traffic directed to the one or more computing devices protected by the security device and received from the device.

In another example, a device includes one or more processors, one or more network interface cards, a fingerprint module, and a security module. The one or more network interface cards receive, from a remote device, network traffic directed to one or more computing devices protected by the device, responsive to receiving the network traffic, send, to the remote device, a request for a plurality of data points of the remote device, wherein the data points include characteristics associated with the remote device, and receive, from the remote device, at least a portion of the requested plurality of data points. The fingerprint module is operable by the one or more processors to compare the received portion of the requested plurality of data points to respective sets of data points associated with one or more known attacker devices, and determine, based on the comparison, whether a first respective set of data points associated with a first known attacker device satisfies a similarity threshold. The security module is operable by the one or more processors to selectively manage, based on the determination, additional network traffic directed to the one or more computing devices protected by the security device and received from the device.

In another example, a computer-readable storage medium is encoded with instructions. The instructions cause one or more programmable processors to receive, from a device, network traffic directed to one or more computing devices protected by the security device, responsive to receiving the network traffic, send, to the device, a request for a plurality of data points for the device, wherein the data points include characteristics associated with the device, and receive, from the device, at least a portion of the requested plurality of data points. The instructions further cause the one or more programmable processors to compare the received portion of the requested plurality of data points to respective sets of data points associated with one or more known attacker devices, determine, based on the comparison, whether a first respective set of data points associated with a first known attacker device satisfies a similarity threshold, and selectively manage, based on the determination, additional network traffic directed to the one or more computing devices protected by the security device and received from the device.

In another example, a method includes receiving, with a security system and from a first security device of a plurality of security devices, device fingerprint information associated with a device, determining, with the security system and based on the received device fingerprint information, whether the device is a known attacker device, and, responsive to determining that the device is the known attacker device, sending, by the security system, the device fingerprint information to the other security devices of the plurality of security devices.

The details of one or more embodiments are set forth in the accompanying drawings and the description below. Other features, objects, and advantages will be apparent from the description and drawings, and from the claims.

DETAILED DESCRIPTION

Figure 1:
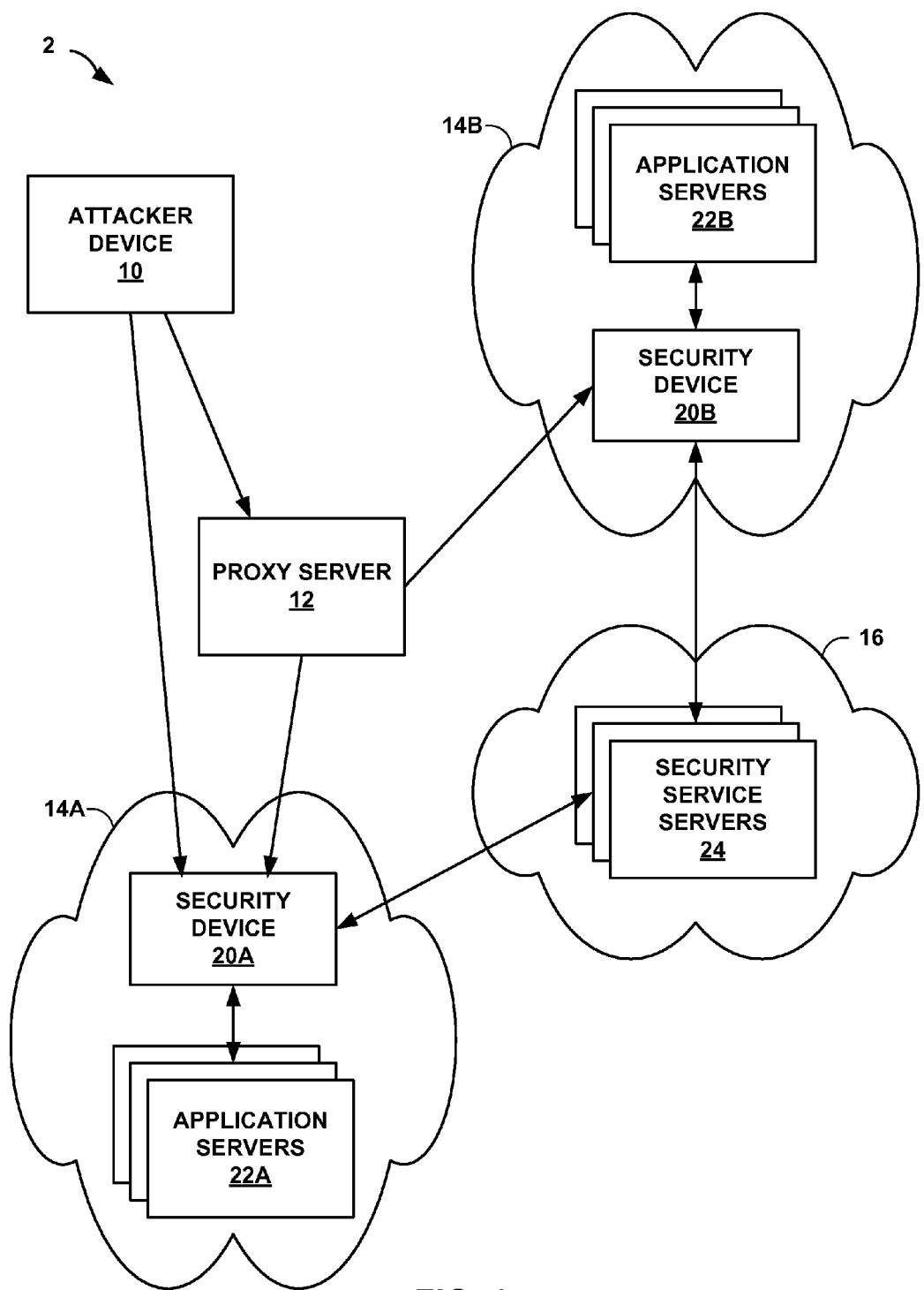
FIG. 1 is a block diagram illustrating an example global device fingerprinting network system, in accordance with one or more aspects of the present disclosure.

FIG. 1 is a block diagram illustrating an example global device fingerprinting network system 2, in accordance with one or more aspects of the present disclosure. As shown in FIG. 1, network system 2 includes attacker device 10, proxy server 12, target networks 14A-14B, and security service 16. Attacker device 10 is one example of a computing device that may be used to attack the network resources of a target network or data center. In some examples, attacker device 10 is a mobile, laptop, desktop, or server computing system or may include multiple computing devices. For instance, attacker device 10 may be a group of computing devices over which an attacker has control (e.g., because the attacker previously hijacked those computing devices). In some examples, attacker device 10 is virtual machine or a software application (e.g., web browser, attacker tool, script, etc.) that is executed by one or more computing devices.

Attacker device 10 may attempt to connect to one or more of target networks 14A, 14B directly or through a proxy server, such as proxy server 12. Proxy server 12 may obfuscate the IP address associated with attacker device 10 by, for example, making the network traffic generated by attacker device 10 appear as if the network traffic is originating at proxy server 12. By obfuscating the IP address of attacker device 10, typical security appliances may allow the attacking network traffic into the target network because the attacking network traffic no longer matches the rules previously configured to block network traffic from attacker device 10. In contrast, security devices 20A, 20B configured in accordance with techniques of this disclosure may continue to block network traffic from attacker device 10, even if attacker device 10 utilizes proxy server 12 for the network attack.

Each of target networks 14A, 14B (collectively, "target networks 14") may include one or more servers for providing web applications, such as application servers 22A, as well as security devices, such as security device 20A. Each target network 14 may include additional network devices, such as firewall, routers, switches, service nodes, etc. (not shown). Application servers 22A and 22B (collectively, "application servers 22") are examples of web application servers that provide web applications for users. In some examples, application servers 22 may be configured as a cluster, as a distributed computing system, or as other redundant and/or load balanced configurations. Security devices 20A, 20B (collectively, "security devices 20") are network devices configured to protect application servers 22 from attacking devices by, for example, identifying and managing network communications received from attacking devices (e.g., attacker device 10).

In one example, attacker device 10 sends a request for content to application servers 22A. The request for content may be sent directly to target network 14A or routed through proxy server 12. A request sent directly to target network 14A refers to a request sent without going through a proxy server (e.g., proxy server 12), but the request may travel through intermediate network devices, such as routers, gateways, firewalls, etc. and/or through intermediate networks and still be considered as being sent directly to target network 14A, in the sense that they are not being sent through a proxy server. In some instances, attacker device 10 may send some requests directly to target network 14A as well as sending other requests through proxy server 12 to target network 14A.

Security device 20A is configured to protect application servers 22A and is positioned, in the network path, between attacker device 10 and application servers 22A. Security device 20A receives the request previously sent by attacker device 10 and initiates a fingerprint building process. The term "fingerprint" refers to the combination of a number of data points about a particular device that can be captured when the device attempts to access a target network by, for example, requesting access to a web application, initiating a virtual private network (VPN) session, initiating a secure shell connection, etc. In general, a fingerprint generated for a particular device may include data points relating to a number of attributes associated with the device, such as User Agent, HTTP_ACCEPT headers, browser plugin details, time zone of the device, screen size and color depth of a monitor of the device, installed system fonts, and whether or not cookies are enabled. In some examples, the fingerprint also includes a data point relating to the IP address of the device.

In one example, in order to generate a fingerprint of attacker device 10, security device 20A may initially allow the request from attacker device 10 to be sent to application servers 22A. In response to determining that one or more of application servers 22A have sent a response message to the request, security device 20A may intercept the response message and inject code in the intercepted response message. The injected code functions to request data points, such as configuration information, from attacker device 10. In another example, security device 20A intercepts the request from attacker device 10 and sends a response to attacker device 10 without allowing the request from attacker device 10 to reach application servers 22A. In this example, security device 20A may generate fake information to include in the response, as well as code that requests configuration information of attacker device 10. In either example, attacker device 10 receives the response to the request and sends at least a portion of the data points requested by security device 20A.

Security device 20A may alternatively or additionally analyze and collect information from the request sent by attacker device 10 (e.g., without injecting code or otherwise requesting specific information from attacker device 10). Security device 20A may also include the information collected from the request in a fingerprint security device 20A generates for attacker device 10. Security device 20A generates a fingerprint from all of the collected information by, for example, collecting a list of all of the distinct values for each data point such that the fingerprint includes a list of values for each particular data point (rather than just a single value for data points for which multiple values were received). In some examples, security device 20A applies a hash function to each data point to anonymize the data points such that the data points do not include any personal information but may still be used to fingerprint a device. If security device 20A is unable to collect values for one or more of the requested data points (e.g., because attacker device 10 does not include the values in a response), security device 20A does not include those values in the fingerprint. Thus, different fingerprints for different device may include different sets of data points.

In some examples, security device 20A compares the generated fingerprint to a locally stored database of previously collected fingerprints that were identified as being fingerprints of attacker devices. If security device 20A determines that there is a match in the local database, security device 20A may manage the network traffic received from attacker device 10 by, for example, initiating countermeasures to inhibit the ability of attacker device 10 to attack target network 14A and application servers 22A. The countermeasures may include sending fake information, dropping network packets received from attacker device 10, slowing down the network connection, removing potentially harmful user input values, redirecting the network packets, or otherwise preventing network packets sent from attacker device 10 from reaching protected resources (e.g., application servers 22A) of target network 14A.

Alternatively, or in addition, to performing a local matching process, security device 20A identifies attacker device 10 as an attacking device by, for example, monitoring the network traffic generated by attacker device 10. The network traffic may include interactions with a fake web application configured with certain security vulnerabilities. By monitoring the network traffic between attacker device 10 and the fake web application, security device 20A can detect if attacker device 10 is attempting to exploit the security vulnerabilities and, if so, determine that attacker device 10 is an attacking device and classify the fingerprint of attacker device 10 as being associated with a know attacker device.

Security device 20A sends the generated fingerprint to a security service (e.g., security service 16). Security device 20A may send additional information to security service 16, such as an identifier of security device 20A and an indication of whether the local matching process or the local attacker determination process indicated that the fingerprint is associated with a known attacker device.

Security service 16 may include a plurality of security service servers 24, which may be configured to provide security services. For example, security service servers 24 may be configured as a cluster or distributed computing system within a cloud data center that manages a global device fingerprint database. Security service servers 24 receive the fingerprint information from security device 20A and compare the fingerprint against a database of known attacker device fingerprints. The comparison may be performed by, for example, applying a hash function to one or more data points of the fingerprint or to the entire fingerprint.

In some cases a fingerprint to be considered to "match" another fingerprint, as the term is used herein, even when one or more data points and/or data values for a particular data point may be different between the two fingerprints. That is, techniques of this disclosure enable a "fuzzy" matching of fingerprints. The term "fuzzy" refers to an imperfect, e.g., non-identical, match of data points and/or data values. Each fingerprint may include a sufficiently large number of data points that, even though only a portion of the data points match a previously classified fingerprint, security service 16 determines that the fingerprints match without returning a meaningful number of false positives. That is, if the matching process returns a sufficiently high match confidence value (e.g., satisfies a threshold confidence value, also referred to herein as a similarity threshold or a threshold level of similarity), security service 16 determines that the received fingerprint effectively matches a previously received fingerprint that corresponds to an attacker device. In some instances, more than one fingerprint may be determined to match the received fingerprint (e.g., more than one fingerprint satisfies the threshold confidence value). In these instances, security service servers 24 may determine that the fingerprint that is the most similar to the received fingerprint is the matching fingerprint.

In some examples, each different data point may be weighted differently based on the likelihood that a changed value or data point indicates that the device associated with the fingerprint is actually different from the attacker device fingerprint previously stored by security service 16. For example, because it is easy for a hacker to change IP addresses, an IP address data point may have a low weighting, which indicates that a mismatch is unlikely to indicate that the fingerprints are actually associated with two different devices. In contrast, a browser plug-in data point may have a higher weighting because it is more likely that the combination of browser plug-ins installed on a particular device is unique, which indicates that a mismatch in the browser plug-in data point indicates that the fingerprints are more likely to identify two different devices.

Responsive to determining that the fingerprint received from security device 20A matches a known attacker fingerprint, security service 16 associates security device 20A with the known attacker device. As one example, security service 16 stores an identifier of security device 20A in the attacker fingerprint database and also associates the identifier of security device 20A with the fingerprint. In this manner, security service 16 may track which security devices have detected attacks by the identified attacker device.

If the fingerprint received from security device 20A was not found in the database of known attacker devices, security service 16 may add the fingerprint to the database when security device 20A indicated that the fingerprint is associated with an attacker device (e.g., based on the monitor of network traffic discussed above). The entry for the fingerprint in the attacker database may include the data points and data values for the fingerprint as well as a global identifier for attacker device 10, a global name for attacker device 10, and global threat information associated with attacker device 10, which may include the attack mechanisms utilized by attacker device 10 and the targets (e.g., software programs, ports, etc.) of the attack. In instances where the fingerprint is a "fuzzy" match (e.g., where one or more data points or data values of a data point changes but the fingerprint is still determined to be a match), security service 16 may update the database entries for the fingerprint to include the changed values.

If the fingerprint was added to the attacker database or the fingerprint data points and/or data values were updated, security service 16 may push the updated attacker database information to other security devices, such as security device 20B. For example, if security device 20A determined that attacker device 10 is an attacker device and sent the fingerprint and related information to security service 16, and in turn security service 16 determined that attacker device 10 is a newly identified attacker device, security service 16 sends the fingerprint, threat information, global attacker device identifier, etc. for attacker device 10 to security device 20B. If attacker device 10 later attacks target network 14B (e.g., via proxy server 12), security device 20B is configured with the fingerprint of attacker device 10 and can protect application servers 22B from attacker device 10 even if one or more data points and/or data values of the fingerprint of attacker device 10 changes (e.g., the IP address changes).

Figure 2:
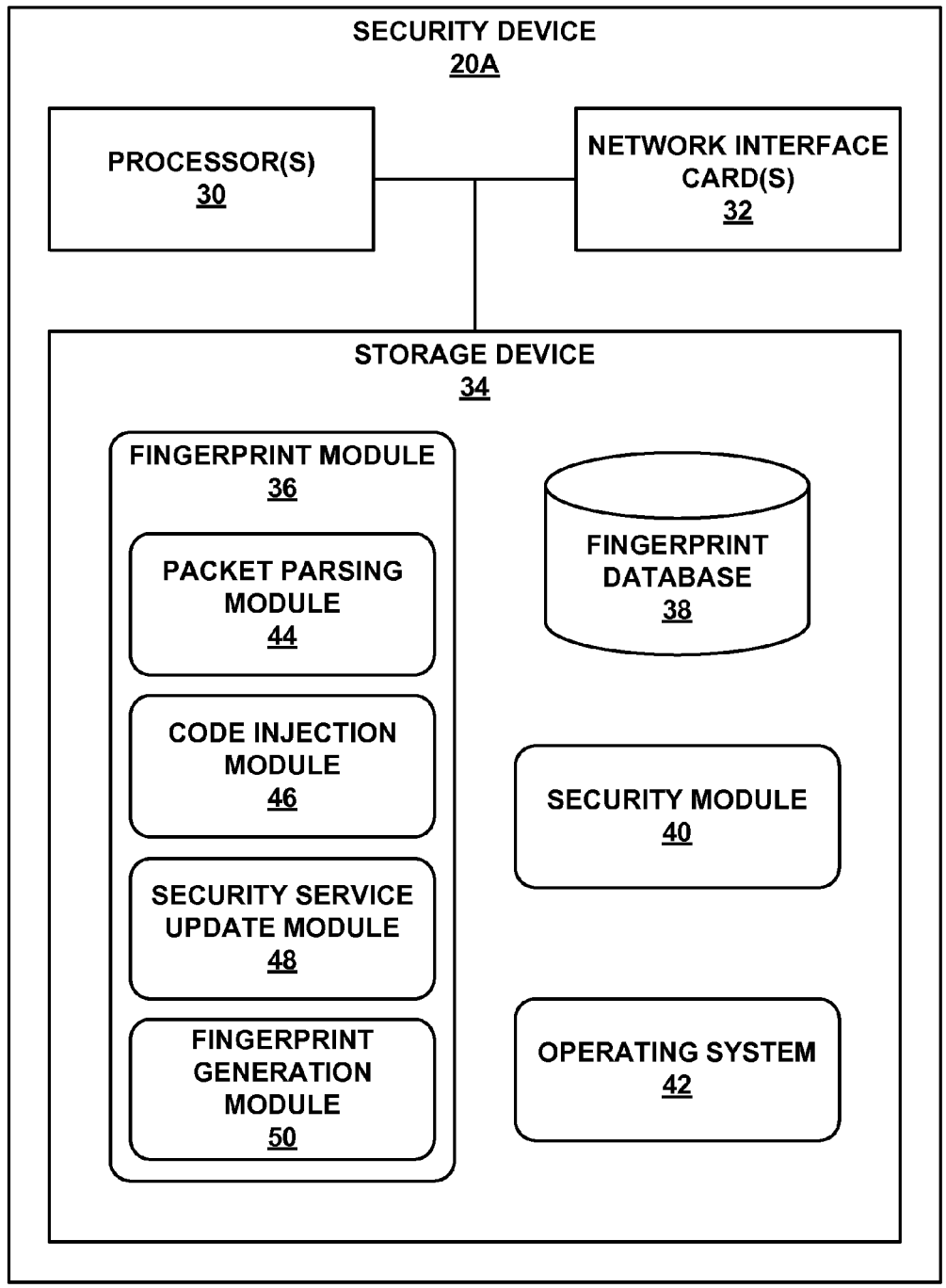
FIG. 2 is a block diagram illustrating an example security device for fingerprinting attacker devices, in accordance with one or more aspects of the present disclosure.

FIG. 2 is a block diagram illustrating an example security device 20A for fingerprinting attacker devices, in accordance with one or more aspects of the present disclosure. FIG. 2 illustrates only one particular example of security device 20A, and many other examples of security device 20A may be used in other instances. For purposes of illustration only, security device 20A is described below in the context of network system 2 of FIG. 1.

As shown in the specific example of FIG. 2, security device 20A may provide an execution environment for executable software instructions. In this example, security device 20A includes one or more processors 30, one or more network interface cards 32, and one or more storage devices 34. Each of components 30, 32, and 34 may be interconnected (physically, communicatively, and/or operatively) by one or more communication channel(s) for inter-component communications. In some examples, the communication channel(s) may include one or more system buses, network connections, inter-process communication data structures, or other channels for communicating data.

Processor(s) 30, in some examples, are configured to implement functionality and/or execute instructions. For example, processor(s) 30 may be capable of processing instructions stored in storage device(s) 34. Examples of processor(s) 30 may include, one or more of a microprocessor, a controller, a digital signal processor (DSP), an application-specific integrated circuit (ASIC), a field-programmable gate array (FPGA), or other type of discrete or integrated logic circuitry.

Storage device(s) 34 may be configured to store program code and/or data for use within security device 20A. In the example of FIG. 2, storage device(s) 34 may store software components including fingerprint module 36, fingerprint database 38, security module 40, and operating system 42. Storage device(s) 34, in some examples, are described as computer-readable storage media. In some examples, storage device(s) 34 include temporary memory, meaning that primary purposes of storage devices 34 are not long-term storage. Storage device(s) 34, in some examples, include volatile memory, meaning that storage device(s) 34 do not maintain stored contents when security device 20A is turned off. Examples of volatile memories may include random access memories (RAM), dynamic random access memories (DRAM), static random access memories (SRAM), and other forms of volatile memories known in the art. In some examples, storage device(s) 34 are used to store program instructions for execution by processor(s) 30. Storage device(s) 34, in some examples, are used by programs or applications running on security device 20A to temporarily store information during program execution.

Storage device(s) 34, in some examples, comprise one or more computer-readable storage media. Storage device(s) 34 may be configured to store larger amounts of information than volatile memory. Storage device(s) 34 may further be configured for long-term storage of information. In some examples, storage device(s) 34 include non-volatile storage elements. Examples of such non-volatile storage elements include magnetic hard discs, optical discs, floppy discs, flash memories, or forms of electrically programmable memories (EPROM) or electrically-erasable and programmable (EEPROM) memories.

Security device 20A may use network interface card(s) 32 to communicate with external devices via one or more communication networks, such as one or more wireless networks. Network interface card(s) 32 may include one or more Ethernet cards, optical transceivers, radio frequency transceivers, or other types of devices that are configured to send and receive information. Other examples of network interfaces may include Bluetooth radios, 3G radios, and WiFi radios, as well as Universal Serial Bus (USB) interfaces. In some examples, security device 20A may use network interface card(s) 32 to wirelessly communicate with another device that is operably coupled to security device 20A.

Operating system 42 may control the operation of components of security device 20A. For example, operating system 42 may facilitate communication between fingerprint module 36, fingerprint database 38 and security module 40, and processors 30, network interface cards 32, and storage devices 34. One or more components of storage devices 34, including operating system 42, fingerprint module 36, fingerprint database 38 and security module 40, may each include program instructions and/or data that may be executable by security device 20A. Fingerprint module 36, fingerprint database 38 and security module 40 may each include instructions that cause security device 20A to perform one or more of the operations and actions described in the present disclosure. In some examples, one or more of the components illustrated in storage device(s) 32 may be implemented in hardware and/or a combination of software and hardware.

In accordance with the techniques of this disclosure, security device 20A receives network traffic from attacker device 10, such as a request for information relating to a web application executing at application servers 22A. The network traffic may be received via one of network interface cards 32. The network traffic is directed to fingerprint module 36 for processing. Fingerprint module 36, as shown in FIG. 2, includes packet parsing module 44, code injection module 46, security service update module 48, and fingerprint generation module 50. Responsive to fingerprint module 36 receiving the request, packet parsing module 44 parses the request to extract information, such as User Agent information, included in the network traffic and that can be used, in combination with other data points, to uniquely identify attacker device 10. The extracted information is provided to fingerprint generation module 50 for use in generating a fingerprint for attacker device 10.

In some examples, the network traffic is passed along to one of application servers 22A (FIG. 1) and application servers 22A generate a response to the network traffic. The response is sent from application servers 22A and is directed to attacker device 10 (e.g., having a destination address associated with attacker device 10). However, before the response leaves target network 14A, security device 20A may intercept the response and may alter the response. For example, code injection module 46 may insert code into the response in order to cause attacker device 10 to provide configuration and other information about attacker device 10. Code injection module 46 may dynamically generate the code based on the type of request and response exchanged. For example, if the network traffic originates from a web browser, code injection module 46 may insert code that is executable by a web browser such that when the response is received by attacker device 10 and displayed within the web browser, the web browser automatically executes the code and the information about attacker device 10 is sent to security device 20A. As another example, if the network traffic originated from a different application, a script, etc., code injection module 46 injects the appropriate type of code into the response. In general, code injection module 46 is configured to inject code into the response such that the code is executed by attacker device 10 and the resulting information returned to security device 20A without requiring a user of attacker device 10 to perform any additional actions, or indeed without a user of attacker device 10 necessarily being aware of the returned information.

In other examples, security module 40 generates and sends false responses to attacker device 10 such that the request is not forwarded to application servers 22A. Instead, security module 40 acts as if it were one of applications servers 22A and exchanges packets with attacker device 10 in an attempt to collect additional information about attacker device 10, without opening up application servers 22A to a possible attack. The responses sent by security module 40 may include code injected into the response by code injection module 46, as described above.

As additional network traffic is received by security device 20A, any additional information that may be extracted from the requests is passed to fingerprint generation module 50. Similarly, the configuration information and other information about attacker device 10 received by security device 20A in response to the injected code being executed by attacker device 10 is provide to fingerprint generation module 50. Fingerprint module 50 collects all of the different data items and associated data values. In some examples, each data item is associated with a different importance ranking such that those data items determined to be of higher importance are data items that are more likely to uniquely identify attacker device 10 while those data items determined to be of lower importance are less likely to uniquely identify attacker 10. Fingerprint module 50 may refrain from generating a fingerprint for attacker device 10 until either the number of data items and corresponding data values for associated with attacker device 10 satisfy a threshold number or the combined importance ranking satisfies a threshold total importance ranking. That is, fingerprint module 50 may refrain from generating a fingerprint for attacker device 10 until fingerprint module 50 has received enough information about attacker device 10 to be able to substantially uniquely identify attacker device 10.

Once fingerprint module 50 has received enough information about attacker device 10 to generate a fingerprint, fingerprint module 50 generates a fingerprint for attacker device 10 and fingerprint module 36 queries fingerprint database 38 to determine if fingerprint database 38 includes a matching fingerprint. While described as a database, fingerprint database 38 may be any data structure or combination of data structures, including hash tables, linked lists, etc. Typically, fingerprint database 38 is configured to store information about fingerprints determined to be associated with known attacker devices (e.g., a blacklist of devices). However, in some examples, fingerprint database 38 may store information about all fingerprints generated by security device 20A, only fingerprints determined to be associated with non-attacker device (e.g., a whitelist of devices), or any combination thereof. In some examples, fingerprint database 38 is configured to store fingerprint information only for those fingerprints generated by security device 20A. In other examples, fingerprint database 38 is configured to store fingerprint information for any fingerprints generated by security device 20A or received from security service 16.

Fingerprint module 36 receives a response to the query and determines if the fingerprint is associated with a known attacker device based on whether the response indicates that fingerprint database 38 includes a matching fingerprint. In general, security device 20A selectively manages network traffic from attacker device 10 based on whether the fingerprint is associated with a known attacker device. For example, if the fingerprint is determined, based on the query results, to be associated with a known attacker device, security device 20A may manage network traffic received from attacker device 10, such as by dropping packets received from attacker device 10, sending attacker device 10 fake information, requesting additional information about attacker device 10 to create a more complete fingerprint, or performing other actions to mitigate any attack attempted by attacker device 10. If the fingerprint is determined, based on the query results, not to be associated with a known attacker device, security device 20A may continue to allow network traffic to be exchanged between attacker device 10 and application servers 22A without applying the various countermeasures described above.

In additional to querying fingerprint database 38, security device 20A may monitor network traffic exchanged between attacker device 10 and application servers 22A to determine if the network traffic is indicative of an attack. If so, security device 20A may determine that attacker device 10 is an attacker device even though the query results may indicate otherwise. However, if the query result indicates that the fingerprint is associated with a known attacker device, security device 20A treats the network traffic received from attacker device 10 as through attacker device 10 is a known attacker device even though the network traffic associated with attacker device 10 is not determined to be indicative of an attack.

Fingerprint generation module 50 provides the generated fingerprint as well as an indication as to whether the fingerprint is associated with a known attacker device to security service update module 48. Security service update module 48 sends the information to security service 16 and receives updated information from security service 16. The update information may include, for example, an indication of whether security service 16 determined that the generated fingerprint matches a fingerprint associated with a known attacker device. As another example, the update information may include information about one or more attacks attempted on other target networks (e.g., target network 14B) by attacker device 10. Responsive to receiving the update information from security service 16, fingerprint module 36 may update fingerprint database 38 and may treat attacker device 10 as a known attacker device even though neither the query results previously received by security device 20A from fingerprint database 38 nor the network traffic exchanged between security device 20A and attacker device 10 were indicative of attacker device 10 being an attacker device.

Figure 3:
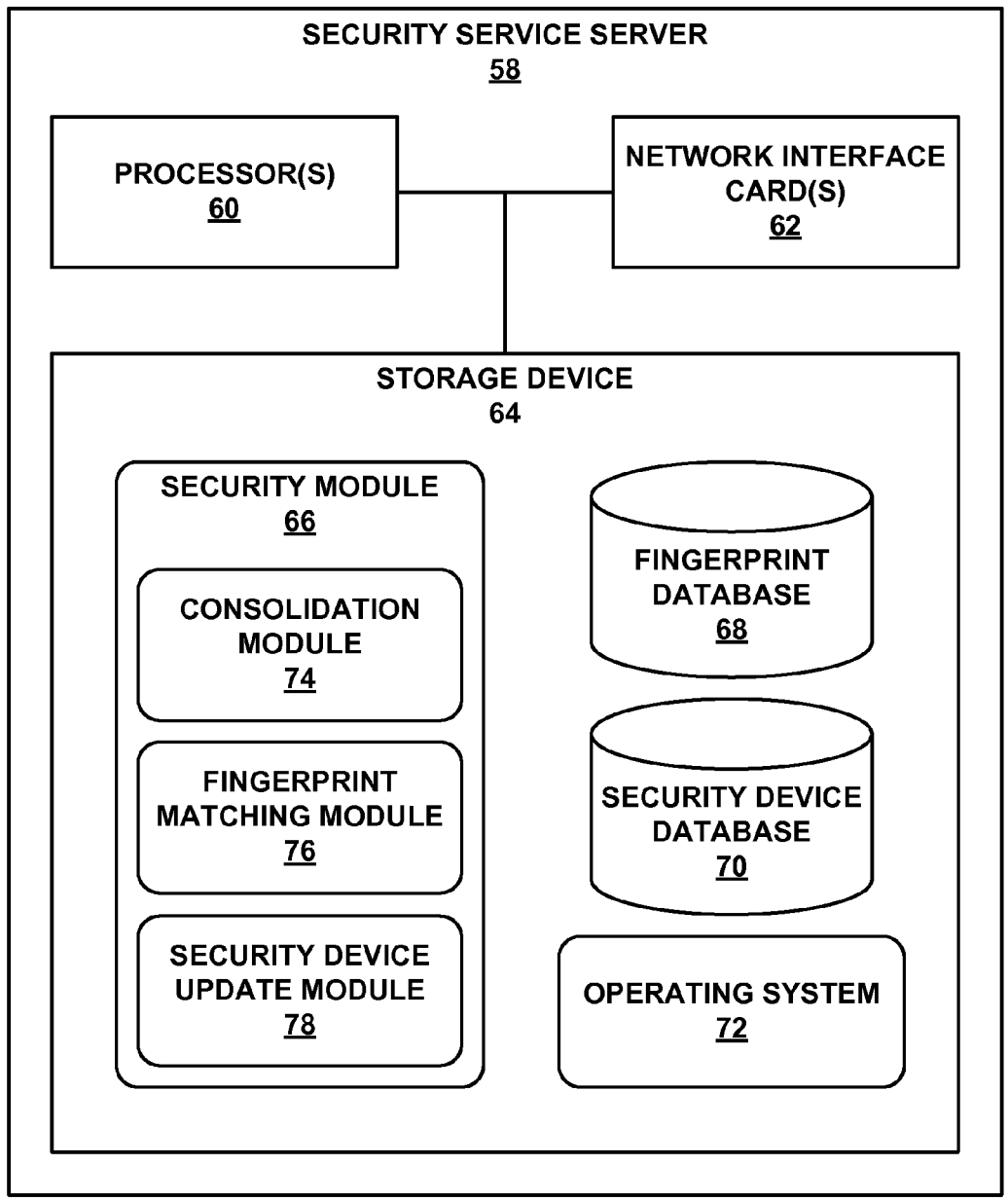
FIG. 3 is a block diagram illustrating an example security service server for consolidating attacker device fingerprints, in accordance with one or more aspects of the present disclosure.

FIG. 3 is a block diagram illustrating an example security service server 58 for consolidating attacker device fingerprints, in accordance with one or more aspects of the present disclosure. FIG. 3 illustrates only one particular example of security service server 58 and may be one example of a security server 24 of FIG. 1. Many other examples of security service server 58 may be used in other instances. For purposes of illustration only, security service server 58 is described below in the context of network system 2 of FIG. 1.

As shown in the specific example of FIG. 3, security service server 58 may provide an execution environment for executable software instructions. In this example, security service server 58 includes one or more processors 60, one or more network interface cards 62, and one or more storage devices 64. Each of components 60, 62, and 64 may be interconnected (physically, communicatively, and/or operatively) by one or more communication channel(s) for inter-component communications. In some examples, the communication channel(s) may include one or more system buses, network connections, inter-process communication data structures, or other channels for communicating data.

Processor(s) 60, in some examples, are configured to implement functionality and/or execute instructions. For example, processor(s) 60 may be capable of processing instructions stored in storage device(s) 64. Examples of processor(s) 60 may include, one or more of a microprocessor, a controller, a digital signal processor (DSP), an application-specific integrated circuit (ASIC), a field-programmable gate array (FPGA), or other type of discrete or integrated logic circuitry.

Storage device(s) 64 may be configured to store program code and/or data for use within security service server 58. In the example of FIG. 3, storage device(s) 64 may store software components including security module 66, fingerprint database 68, security device database 70, and operating system 72. Storage device(s) 64, in some examples, are described as computer-readable storage media. In some examples, storage device(s) 64 include temporary memory, meaning that primary purposes of storage devices 64 are not long-term storage. Storage device(s) 64, in some examples, include volatile memory, meaning that storage device(s) 64 do not maintain stored contents when security service server 58 is turned off. Examples of volatile memories may include random access memories (RAM), dynamic random access memories (DRAM), static random access memories (SRAM), and other forms of volatile memories known in the art. In some examples, storage device(s) 64 are used to store program instructions for execution by processor(s) 60. Storage device(s) 64, in some examples, are used by programs or applications running on security service server 58 to temporarily store information during program execution.

Storage device(s) 64, in some examples, comprise one or more computer-readable storage media. Storage device(s) 64 may be configured to store larger amounts of information than volatile memory. Storage device(s) 64 may further be configured for long-term storage of information. In some examples, storage device(s) 64 include non-volatile storage elements. Examples of such non-volatile storage elements include magnetic hard discs, optical discs, floppy discs, flash memories, or forms of electrically programmable memories (EPROM) or electrically-erasable and programmable (EEPROM) memories.

Security service server 58 may use network interface card(s) 62 to communicate with external devices via one or more communication networks, such as one or more wireless networks. Network interface card(s) 62 may include one or more Ethernet cards, optical transceivers, radio frequency transceivers, or other types of devices that are configured to send and receive information. Other examples of network interfaces may include Bluetooth radios, 3G radios, and WiFi radios, as well as Universal Serial Bus (USB) interfaces. In some examples, security service server 58 may use network interface card(s) 62 to wirelessly communicate with another device that is operably coupled to security service server 58.

Operating system 72 may control the operation of components of security service server 58. For example, operating system 72 may facilitate communication between security module 66, fingerprint database 68 and security device database 70, and processors 60, network interface cards 62, and storage devices 64. One or more components of storage devices 64, including operating system 72, fingerprint module 66, fingerprint database 68 and security device database 70, may each include program instructions and/or data that may be executable by security service server 58. Fingerprint module 66, fingerprint database 68 and security device database 70 may each include instructions that cause security service server 58 to perform one or more of the operations and actions described in the present disclosure. In some examples, one or more of the components illustrated in storage device(s) 62 may be implemented in hardware and/or a combination of software and hardware.

In accordance with techniques of the present disclosure, security service server 58 receives fingerprint information from one or more security devices (e.g., security devices 20A and 20B). In general, security service server 58 maintains security device database 70. Security device database 70 includes information about security device that subscribe to the security service provided by security service 16 and security service server 58. If the security devices providing information to security service server 58 are not included in security device database 70, security service server 58 may discard the fingerprint information.

The fingerprint information provided to security service server 58 may include data points and data values for the fingerprint as well as a global identifier for attacker device 10, a global name for attacker device 10, and global threat information associated with attacker device 10. For example, global threat information may include the attack mechanisms utilized by attacker device 10 and the targets (e.g., software programs, ports, etc.) of the attack. In examples where the fingerprint information is received from a security device registered with security service server 58 (e.g., there is an entry in security device database 70 associated with the sending security device), the fingerprint information is provided to security module 66.

Security module 66, as shown in FIG. 3, includes consolidation module 74, fingerprint matching module 76, and security device update module 78. Fingerprint matching module 76 determines whether one of the fingerprints stored in fingerprint database 68 matches the received fingerprint. In determining if the received fingerprint matches a fingerprint of fingerprint database 68, fingerprint matching module 76 may apply one or more fingerprint matching rules. In general, a fingerprint matching rule is a rule that defines what constitutes a successful match between two fingerprints. Rules are made up of a collection of data point formatters, and some high level rules that affect when the list of candidate matches can be associated. Fingerprint matching module 76 utilizes the data point formatters to calculate the actual hashes used for comparison and to track the list of candidate matches. If two fingerprints match, consolidation module 74 merges the data points and values of the received fingerprint with the matching fingerprint information stored in fingerprint database 68. However, consolidation module 74 discards duplicate data points and values.

To find matches within fingerprint database 68, fingerprint matching module 76 may apply "fuzzy" hashing techniques. By using a fuzzy hashing algorithm, fingerprint matching module 78 may perform a quick comparison to determine if two things are similar. In accordance with techniques of this disclosure, fingerprint matching module 78 applies a fuzzy hashing algorithm to determine if two different fingerprints are similar. That is, techniques of this disclosure enable a "fuzzy" matching of fingerprints. In the context of device fingerprints having data points and associated values, the term "fuzzy" refers to an imperfect match of the data points and/or the associated data values. Each fingerprint may include a sufficiently large number of data points such that, even though only a portion of the data points match a previously classified fingerprint, fingerprint matching module 76 determines that the fingerprints match without returning a meaningful number of false positives. That is, if the matching process returns a sufficiently high match confidence value (e.g., satisfies a threshold confidence value), fingerprint matching module 76 determines that the received fingerprint matches a previously received fingerprint that corresponds to an attacker device.

In some examples, fingerprint matching module 78 may apply different weights to each different data point based on the likelihood that a changed value or data point indicates that the device associated with the fingerprint is actually different from the attacker device fingerprint previously stored within fingerprint database 68. For example, because it is easy for a hacker to change IP addresses, fingerprint matching module 76 may associate an IP address data point with a low weighting, which indicates that a mismatch is unlikely to indicate that the fingerprints are actually associated with two different devices. In contrast, fingerprint matching module 78 may apply a higher weighting value to a browser plug-in data point because it is more likely that the combination of browser plug-ins installed on a particular device is unique, which indicates that a mismatch in the browser plug-in data point indicates that the fingerprints are more likely to identify two different devices.

Responsive to determining that the fingerprint received from security device 20A matches a known attacker fingerprint, consolidation module 76 associates security device 20A with the known attacker device. Consolidation module 76 may also consolidate various sessions that involve attacker device 10 and any of security devices 20 such that all of the relevant fingerprint information is consolidated and associated with the same device fingerprint. If the fingerprint information stored in fingerprint database 68 differs from the received fingerprint information, security device update module 78 sends the merged fingerprint to security device 20A. If the fingerprint information stored in fingerprint database 68 is the same as the received fingerprint information, security device update module 78 refrains from sending updated fingerprint information to security device 20A. In either instance, security device update module 78 may send fingerprint information to one or more security devices registered with security service 16 (e.g., security devices having entries within security device database 70). For example, security device update module 78 may send the fingerprint, threat information, global attacker device identifier, etc. to security device 20B.

Figure 4:
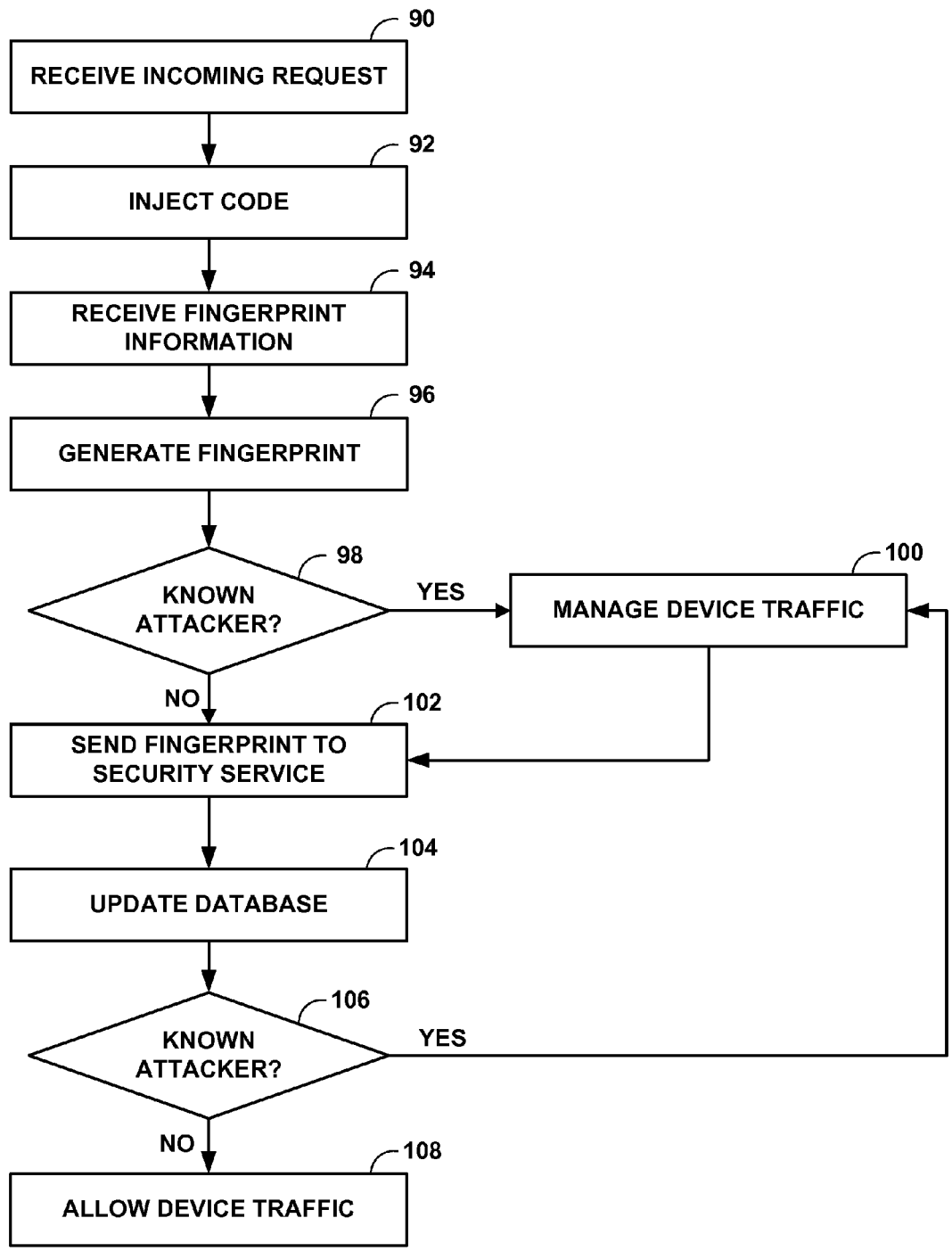
FIG. 4 is a flowchart illustrating an example process for fingerprinting an attacker device, in accordance with one or more aspects of the present disclosure.

FIG. 4 is a flowchart illustrating an example process for fingerprinting an attacker device, in accordance with one or more aspects of the present disclosure. For purposes of illustration only, the example operations are described below within the context of security device 20A, as shown in FIGS. 1 and 2. Other example security devices may also perform the example operations described below.

Security device 20A receives an incoming request for data from a possible attacker device (e.g., attacker device 10) (90). Packet parsing module 44 parses the request to extract information, such as User Agent information, included in the request and that can be used, in combination with other data points, to uniquely identify attacker device 10. Security device 20A forwards the incoming request to one of applications servers 22 that processes the request and sends a response. Security device 20A intercepts the response and code injection module 46 injects codes that causes attacker device 10 to send fingerprint data points and associated values to security device 20A (92). Attacker device 10 receives the response and sends the fingerprint data points and associated values to security device 20A without requiring a user of attacker device 10 to perform any additional actions.

Security device 20A receives the fingerprint information (94) and fingerprint generation module 50 generates a device fingerprint for attacker device 10 (96). Using the generated fingerprint, fingerprint module 36 determines if a matching fingerprint is stored within fingerprint database 38 (98). If a matching fingerprint is found within fingerprint database 38 ("YES" branch of 98) security device 20A may actively manage all traffic from attacker device from reaching application servers 22A (100) by, for example, blocking the network traffic, throttling network traffic, redirecting network traffic, logging the network traffic, or taking other counter measures to minimize the impact of any potential attack originating from attacker device 10. For example, security module 40 may intercept all packets sent by attacker device 10 and provide fake responses in order to collect additional fingerprint data points. In some examples, security device 20A may determine that attacker device 10 is an attacking device based on the network traffic generated by attacker device. For example, if attacker device 10 is probing known security vulnerabilities of software executing at applications servers 22A, security device 20A determines that attacker device 10 is an attacking device and may manage network traffic originating from attacker device 10 by, for example, blocking the network traffic, throttling network traffic, redirecting network traffic, logging the network traffic, or taking other counter measures to minimize the impact of any potential attack originating from attacker device 10. If a matching fingerprint is not found within fingerprint database 38 ("NO" branch of 98), security device 20A may temporarily allow the network traffic from attacker device 10 to reach application servers 22A.

In either instance, security service update module 48 sends the fingerprint and associated information to security server 16 (102). Security service 16 determines if the fingerprint matches a fingerprint managed by security service 16 and, if there is a match and/or if the fingerprint information sent results in updated fingerprint information (e.g., a merged fingerprint), security service sends the fingerprint information to security device 20A. Security device 20A receives the fingerprint information from security service 16 and updates fingerprint database 38 based on the received fingerprint information (104). If the received fingerprint information indicates that the fingerprint is associated with a known attacker device ("YES" branch of 106), security device 20A manages network traffic sent by attacker device 10 from reaching application servers 22A (100). If the received fingerprint information indicates that the fingerprint is not associated with a known attacker device ("NO" branch of 106), security device 20A allows network traffic to be freely exchanged between attacker device 10 and applications servers 22A (108).

Figure 5:
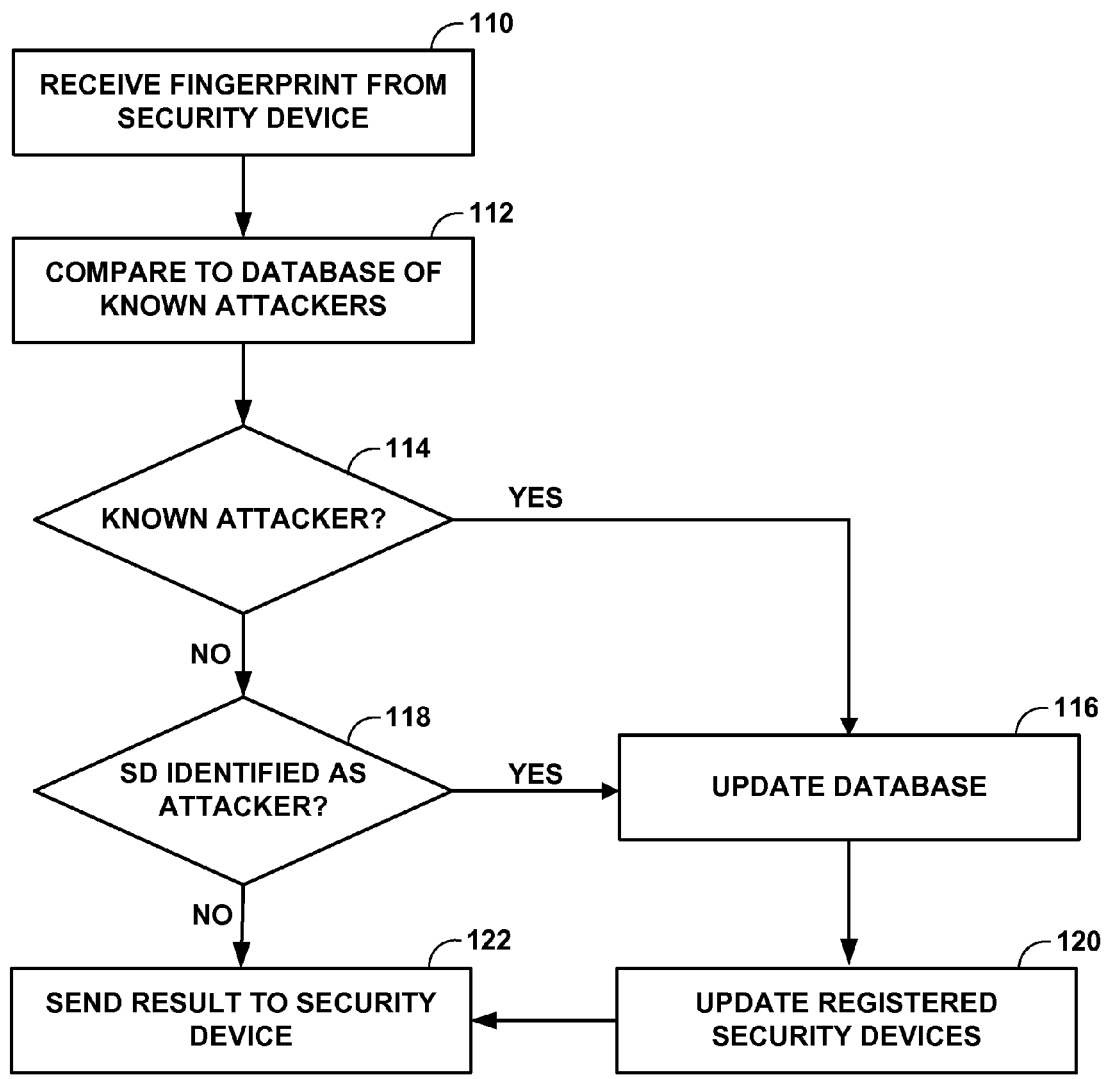
FIG. 5 is a flowchart illustrating an example process for maintaining global device fingerprinting with a central security service.

FIG. 5 is a flowchart illustrating an example process for maintaining global device fingerprinting with a central security service. For purposes of illustration only, the example operations are described below within the context of network system 2, as shown in FIG. 1, and security service server 58, as shown in FIG. 2. Other example security servers may also perform the example operations described below.

Security service server 58 receives fingerprint information from one of security devices 20A and 20B (110). Fingerprint matching module 76 determines whether one of the fingerprints stored in fingerprint database 68 matches the received fingerprint by comparing the fingerprint to fingerprints of known attacker device stored in fingerprint database 68 (112). To find matches within fingerprint database 68, fingerprint matching module 76 may apply "fuzzy" hashing techniques to identify fingerprints that are similar to the received fingerprint. When the fingerprint is sufficiently similar (i.e., satisfies a threshold level of similarity), fingerprint matching module 76 determines that the stored fingerprint matches the received fingerprint ("YES" branch of 114). In some instances, more than one fingerprint may be determined to satisfy the similarity threshold. In these instances, security service servers 24 may determine that the fingerprint that is the most similar to the received fingerprint is the matching fingerprint. If the information stored in fingerprint database 68 different from the received fingerprint information, security module 66 updates fingerprint database 68 by, for example, utilizing consolidation module 74 to merge the matching fingerprint information with the received fingerprint information (116).

If fingerprint matching module 76 determines that there not a matching fingerprint stored in fingerprint database 68 ("NO" branch of 114), security module determines if the security device that send the fingerprint information identified the device associated with the fingerprint as an attacking device (118). If the security device identified the device associated with the fingerprint as an attacking device ("YES" branch of 118), security module 66 updates fingerprint database 68 to include the received fingerprint information (116). Responsive to fingerprint database 68 being updated, security device update module 78 sends updated fingerprint information to the security devices registered with security service 16 (120) and security module 66 sends any updated or changed fingerprint information to the security device that sent the initial fingerprint information to security service server 58 (122). If the security device did not identify the device associated with the fingerprint as an attacking device ("NO" branch of 118), security module 66 may send the query result to the security device that sent the fingerprint information to indicate that the device associated with the fingerprint is not a known attacker device (122).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments of the have been described. These and other embodiments are within the scope of the following claims.

What is claimed is:

1. A method comprising:
   receiving, by a security device and from a device, network traffic directed to one or more computing devices protected by the security device;
   forwarding the network traffic to the one or more computing devices;
   responsive to receiving, from the one or more computing devices, a response to the network traffic:
      injecting, by the security device, into the response to form a modified response, code requesting a plurality of data points from the device, wherein the plurality of data points includes at least configuration information of the device; and
      sending, by the security device and to the device, the modified response;
   receiving, by the security device and from the device, at least a portion of the requested plurality of data points, wherein the portion of the requested plurality of data points includes one or more of a User Agent of the device, HTTP_ACCEPT headers of the device, browser plugin information of the device, time zone information of the device, screen size of a monitor of the device, color depth of the monitor of the device, system fonts installed at the device, or whether cookies are enabled at the device;
   comparing, by the security device, the received portion of the requested plurality of data points to respective sets of data points associated with one or more known attacker devices;
   determining, based on the comparison, whether a first respective set of data points associated with a first known attacker device satisfies a similarity threshold; and
   selectively managing, based on the determination, additional network traffic directed to the one or more computing devices protected by the security device and received from the device.

2. The method of claim 1, further comprising:
   analyzing, by the security device, the network traffic to extract information relating to one or more data points about the device; and
   generating, by the security device, a device fingerprint for the device from the information relating to the one or more data points and the received portion of the requested plurality of data points, wherein the device fingerprint identifies the device.

3. The method of claim 2, further comprising:
   sending, by the security device, to a cloud-based security service, the device fingerprint of the device;
   receiving, by the security device, from the cloud-based security service, an indication of whether the device is a known attacker device; and
   selectively managing, by the security device, based on the indication, the additional network traffic directed to the one or more computing devices protected by the security device and received from the device.

4. The method of claim 2, further comprising:
determining, by the security device and based on the network traffic received from the device, that the device is an attacker device; and
sending, from the security device and to a cloud-based security service, the device fingerprint of the device and an indication that the device is the attacker device.

5. The method of claim 2, further comprising:
receiving, by the security device, device fingerprint information from a cloud-based security service;
comparing the generated device fingerprint information to the received device fingerprint to determine if the device is an attacker device; and
selectively managing, based on the comparison, the additional network traffic directed to the one or more computing devices protected by the security device and received from the device.

6. The method of claim 1, wherein comparing the received portion of the requested plurality of data points to respective sets of data points associated with known attacker devices comprises applying a fuzzy hashing algorithm to the received portion of the requested plurality of data points.

7. The method of claim 6, further comprising determining, based on the application of the fuzzy hashing algorithm, that an imperfect match of the received portion of the requested plurality data points to the first respective set of data points associated with a first known attacker device satisfies the similarity threshold.

8. The method of claim 1, wherein selectively managing, based on the determination, the additional network traffic directed to the one or more computing devices protected by the security device and received from the device comprises:
responsive to determining that the first respective set of data points associated with the first known attacker device does not satisfy the similarity threshold, permitting the additional network traffic from the device to reach the one or more computing devices protected by the security device; and
responsive to determining that the first respective set of data points associated with a first known attacker device satisfies the similarity threshold, preventing the additional network traffic from reaching the one or more computing devices protected by the security device.

9. The method of claim 1, wherein selectively managing the additional network traffic comprises, responsive to determining that the first respective set of data points associated with a first known attacker device satisfies the similarity threshold, managing the additional network traffic by performing one or more of throttling the additional network traffic, removing one or more user input values from the additional network traffic, dropping the additional network traffic, and redirecting the additional network traffic to a different device.

10. The method of claim 1, further comprising:
responsive to determining that the first respective set of data points associated with a first known attacker device satisfies a similarity threshold:
determining that the device is a known attacker device;
preventing additional network traffic from reaching the one or more computing devices protected by the security device; and
generating, with the security device, a response to the additional network traffic that includes a request for additional data points of the device.

11. A device comprising:
one or more processors;
one or more network interface cards to receive, from a remote device, network traffic directed to one or more computing devices protected by the device, forward the network traffic to the one or more computing devices, receive, from the one or more computing devices, a response to the network traffic, send, to the remote device, a modified response;
a fingerprint module comprising a code injection module operable by the one or more processors to, prior to sending the modified response, inject, into the response to form the modified response, code requesting a plurality of data points, wherein the plurality of data points includes at least configuration information of the device; and
a security module,
wherein the network interface cards receive at least a portion of the requested data points, wherein the portion of the requested plurality of data points includes one or more of a User Agent of the device, HTTP_ACCEPT headers of the device, browser plugin information of the device, time zone information of the device, screen size of a monitor of the device, color depth of the monitor of the device, system fonts installed at the device, or whether cookies are enabled at the device
wherein the fingerprint module is operable by the one or more processors to compare the received portion of the requested plurality of data points to respective sets of data points associated with known one or more attacker devices, and determine, based on the comparison, whether a first respective set of data points associated with a first known attacker device satisfies a similarity threshold, and
wherein the security module is operable by the one or more processors to selectively manage, based on the determination, additional network traffic directed to the one or more computing devices protected by the security device and received from the device.

12. The device of claim 11, wherein the fingerprint module comprises:
a packet parsing module operable by the one or more processors to analyze the network traffic to extract information relating to one or more data points about the remote device; and
a fingerprint generation module operable by the one or more processors to a device fingerprint for the remote device from the information relating to the one or more data points and the received portion of the requested plurality of data points, wherein the device fingerprint identifies the remote device.

13. The device of claim 12,
wherein the one or more network interface cards send, to a cloud-based security service, the device fingerprint of the remote device, and receive, from the cloud-based security service, an indication of whether the remote device is a known attacker device, and
wherein the security module is operable by the one or more processors to selectively manage, based on the indication, the additional network traffic directed to the one or more computing devices protected by the device and received from the remote device.

14. The device of claim 12, wherein the fingerprint module is operable by the one or more processors to determine, based on the network traffic received from the remote device, that the remote device is an attacker device, and send, to a cloud-based security service, the device fingerprint of the remote device and an indication that the remote device is the attacker device.

15. The device of claim 12,
wherein the one or more network interface cards receive device fingerprint information from a cloud-based security service,
wherein the fingerprint module compares the generated device fingerprint information to the received device fingerprint to determine if the remote device is an attacker device, and wherein the security module is operable by the one or more processors to selectively manage, based on the comparison, the additional network traffic directed to the one or more computing devices protected by the device and received from the remote device.

16. The device of claim 11, wherein the fingerprint module applies a fuzzy hashing algorithm to the received portion of the requested plurality of data points to compare the received portion of the requested plurality of data points to respective sets of data points associated with known attacker devices.

17. The device of claim 16, wherein the fingerprint module determines, based on the application of the fuzzy hashing algorithm, that an imperfect match of the received portion of the requested plurality data points to the first respective set of data points associated with a first known attacker device satisfies the similarity threshold.

18. The device of claim 11, wherein the security module is operable by the one or more processors to selectively manage, based on the indication, the additional network traffic directed to the one or more computing devices protected by the device and received from the remote device by at least being operable to:
responsive to determining that the first respective set of data points associated with the first known attacker device does not satisfy the similarity threshold, permit the additional network traffic to reach the one or more computing devices protected by the device; and
responsive to determining that the first respective set of data points associated with a first known attacker device satisfies the similarity threshold, prevent the additional network traffic from reaching the one or more computing devices protected by the device.

19. The device of claim 11, wherein the security module is operable by the one or more processors to, responsive to the fingerprint module determining that the first respective set of data points associated with a first known attacker device satisfies a similarity threshold: manage the additional network traffic by performing one or more of throttling the additional network traffic, removing one or more user input values from the additional network traffic, dropping the additional network traffic, and redirecting the additional network traffic to a different device.

20. A non-transitory computer-readable storage medium encoded with instructions for causing one or more processors to:

receive, from a device, network traffic directed to one or more computing devices protected by the security device;
forward the network traffic to the one or more computing devices;
responsive to receiving, from the one or more computing device, a response to the network traffic:
inject, into the response to form a modified response, code requesting a plurality of data points, wherein the plurality of data points includes at least configuration information of the device; and
send, to the device, the modified response;
receive, from the device, at least a portion of the requested plurality of data points, wherein the portion of the requested plurality of data points includes one or more of a User Agent of the device, HTTP_ACCEPT headers of the device, browser plugin information of the device, time zone information of the device, screen size of a monitor of the device, color depth of the monitor of the device, system fonts installed at the device, or whether cookies are enabled at the device;
compare the received portion of the requested plurality of data points to respective sets of data points associated with one or more known attacker devices;
determine, based on the comparison, whether a first respective set of data points associated with a first known attacker device satisfies a similarity threshold; and
selectively manage, based on the determination, additional network traffic directed to the one or more computing devices protected by the security device and received from the device.

21. The non-transitory computer-readable storage medium of claim 20, further encode with instructions for causing one or more processors to:
analyze the network traffic to extract information relating to one or more data points about the device; and
generate a device fingerprint for the device from the information relating to the one or more data points and the received portion of the requested plurality of data points, wherein the device fingerprint identifies the device.

22. The non-transitory computer-readable storage medium of claim 21, further encode with instructions for causing one or more processors to:
send, to a cloud-based security service, the device fingerprint of the device;
receive, from the cloud-based security service, an indication of whether the device is a known attacker device; and
selectively manage, based on the indication, the additional network traffic directed to the one or more computing devices protected by the security device and received from the device.

* * * * *